United States Patent
Park et al.

(10) Patent No.: US 10,670,934 B2
(45) Date of Patent: Jun. 2, 2020

(54) DISPLAY DEVICE

(71) Applicant: Samsung Display Co., Ltd., Yongin-Si, Gyeonggi-Do (KR)

(72) Inventors: Do Yeong Park, Hwaseong-si (KR); Seung Bo Shim, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/297,274

(22) Filed: Mar. 8, 2019

(65) Prior Publication Data
US 2019/0377233 A1    Dec. 12, 2019

(30) Foreign Application Priority Data

Jun. 7, 2018 (KR) .................. 10-2018-0065629

(51) Int. Cl.
| | | |
|---|---|---|
| *H01L 29/04* | (2006.01) | |
| *H01L 31/036* | (2006.01) | |
| *G02F 1/1362* | (2006.01) | |
| *G02F 1/1337* | (2006.01) | |
| *G02F 1/1339* | (2006.01) | |
| *G02F 1/1335* | (2006.01) | |

(52) U.S. Cl.
CPC ...... *G02F 1/136286* (2013.01); *G02F 1/1339* (2013.01); *G02F 1/133528* (2013.01); *G02F 1/133707* (2013.01); *G02F 1/136209* (2013.01); *G02F 2001/136222* (2013.01)

(58) Field of Classification Search
CPC .............. H01L 27/124; H01L 27/1248; H01L 27/1122; H01L 29/78669; H01L 29/78609; G02F 1/136286; G02F 1/133528; G02F 1/133707; G02F 1/3339; G02F 1/136209

USPC .......................................................... 257/72
See application file for complete search history.

(56) References Cited

U.S. PATENT DOCUMENTS

2011/0149186 A1*  6/2011  Song .................... G02F 1/1343
                                                               349/42
2016/0195748 A1*  7/2016  Lee .................. G02F 1/133512
                                                               349/43
(Continued)

FOREIGN PATENT DOCUMENTS

KR            10-1093226 B1    12/2011
KR      10-2014-0028390 A       3/2014
(Continued)

*Primary Examiner* — David S Blum
(74) *Attorney, Agent, or Firm* — Innovation Counsel LLP

(57) ABSTRACT

A display device includes: a first substrate including a display area and a non-display area disposed; a first semiconductor disposed in the display area; a second semiconductor disposed in the non-display area; a first data conductor overlapping the first semiconductor; a second data conductor overlapping the second semiconductor; a first shielding part overlapping the first semiconductor and disposed on the first data conductor; a second shielding part overlapping the second semiconductor and disposed on the second data conductor; an insulating layer disposed on the first shielding part and the second shielding part, wherein a second thickness of the second shielding part is larger than a first thickness of the first shielding part, and a fourth thickness of a second part of the insulating layer corresponding to the second shielding part is smaller than a third thickness of a first part of the insulating layer corresponding to the first shielding part.

20 Claims, 17 Drawing Sheets

(56) References Cited

U.S. PATENT DOCUMENTS

2016/0357042 A1* 12/2016 Yoon .................. G02F 1/1339
2018/0356677 A1    12/2018 Kim et al.

FOREIGN PATENT DOCUMENTS

| KR | 10-2016-0028580 A | 3/2016 |
| KR | 10-2016-0080741 A | 7/2016 |
| KR | 10-1724558 B1     | 4/2017 |

* cited by examiner

DISPLAY DEVICE

CROSS-REFERENCE TO RELATED APPLICATION

This application claims priority to and the benefit of Korean Patent Application No. 10-2018-0065629 filed in the Korean Intellectual Property Office on Jun. 7, 2018, the entire contents of which are incorporated herein by reference.

BACKGROUND

(1) Technical Field

The present application is generally related to a display device.

(2) Description of the Related Art

A liquid crystal display used as a display device may include two field generating electrodes, a liquid crystal layer, a color filter, and a polarization layer. Light leakage may be generated in the polarization layer and the color filter of the display device. Accordingly, to achieve a display device with reduced light leakage and high color reproducibility, a display device including a color conversion display panel has been proposed.

The above information disclosed in this Background section is only for enhancement of understanding of the background of the present inventive concept and therefore it may contain information that does not form the prior art that is already known in this country to a person of ordinary skill in the art.

SUMMARY

The present exemplary embodiment is to improve stains of the display device.

A display device according to an exemplary embodiment of the present inventive concept includes: a first substrate including a display area and a non-display area disposed outside the display area; a first semiconductor disposed in the display area of the first substrate; a second semiconductor disposed in the non-display area of the first substrate; a first data conductor overlapping the first semiconductor; a second data conductor overlapping the second semiconductor; a first shielding part overlapping the first semiconductor and disposed on the first data conductor; a second shielding part overlapping the second semiconductor and disposed on the second data conductor; and an insulating layer disposed on the first shielding part and the second shielding part, wherein a second thickness of the second shielding part is larger than a first thickness of the first shielding part, and a fourth thickness of a second part of the insulating layer corresponding to the second shielding part is smaller than a third thickness of a first part of the insulating layer corresponding to the first shielding part.

The first thickness may be a minimum thickness of the first shielding part corresponding to the first semiconductor, and the second thickness may be a minimum thickness of the second shielding part corresponding to the second semiconductor.

A sum of the first thickness and the third thickness may be a same sum as a sum of the second thickness and the fourth thickness.

A first spacer overlapping the first shielding part and a second spacer overlapping the second shielding part may be further included.

A light unit overlapping the first substrate and emitting light of a first wavelength may be further included, and the first shielding part and the second shielding part may be configured to absorb the light of the first wavelength.

A gate driver disposed in the non-display area and including first transistors including the second semiconductor may be further included, the insulating layer may include at least one thickness differential region overlapping the gate driver, and an average thickness of the thickness differential region may be smaller than the average thickness of the insulating layer except for the thickness differential region.

The gate driver may include a plurality of stages arranged in a first direction, and the thickness differential region may extend in the first direction to overlap the gate driver.

The insulating layer may include a plurality of separated thickness differential regions overlapping the gate driver.

A first spacer overlapping the first shielding part and a second spacer overlapping the second shielding part and the thickness differential region may be further included.

An upper surface of the thickness differential region may have protrusions and depressions.

The insulating layer disposed in the gate driver may have a plurality of contact holes, and a boundary of the thickness differential region may be separated from the contact hole.

A second substrate parallel to the first substrate, a polarization layer disposed between the insulating layer and the second substrate, and a color conversion layer disposed between the second substrate and the polarization layer may be further included, the polarization layer may have reflectance, and the first shielding part and the second shielding part may be configured to prevent light reflected from the polarization layer from being incident to the first semiconductor and the second semiconductor.

The insulating layer may include an organic material.

A display device according to an exemplary embodiment includes: a first substrate including a display area and a non-display area disposed outside the display area; a first semiconductor disposed in the display area of the first substrate; a second semiconductor disposed in the non-display area of the first substrate; a first shielding part overlapping the first transistor; a second shielding part overlapping the second transistor; and an insulating layer disposed on the first shielding part and the second shielding part, wherein the first shielding part and the second shielding part are disposed at a same layer and include a same material as each other, and a minimum thickness of the insulating layer overlapping the second shielding part is smaller than a minimum thickness of the insulating layer overlapping the first shielding part.

The insulating layer may include at least one thickness differential region disposed in the non-display area, and an average thickness of the thickness differential region may be smaller than an average thickness of the insulating layer except for the thickness differential region.

A first spacer overlapping the first shielding part and a second spacer overlapping the second shielding part and the thickness differential region may be further included.

An upper surface of the thickness differential region may include protrusions and depressions.

An average thickness of the second shielding part may be larger than an average thickness of the second shielding part.

The insulating layer may include an organic material.

A second substrate parallel to the first substrate, a polarization layer disposed between the insulating layer and the second substrate, and a color conversion layer disposed between the second substrate and the polarization layer may be further included, the polarization layer may have reflectance, and the first shielding part and the second shielding part may be configured to prevent light reflected from the polarization layer from being incident to the first transistor and the second transistor.

According to exemplary embodiments of the present disclosure, stains of the display device may be improved.

DETAILED DESCRIPTION OF THE EMBODIMENTS

Figure 1:
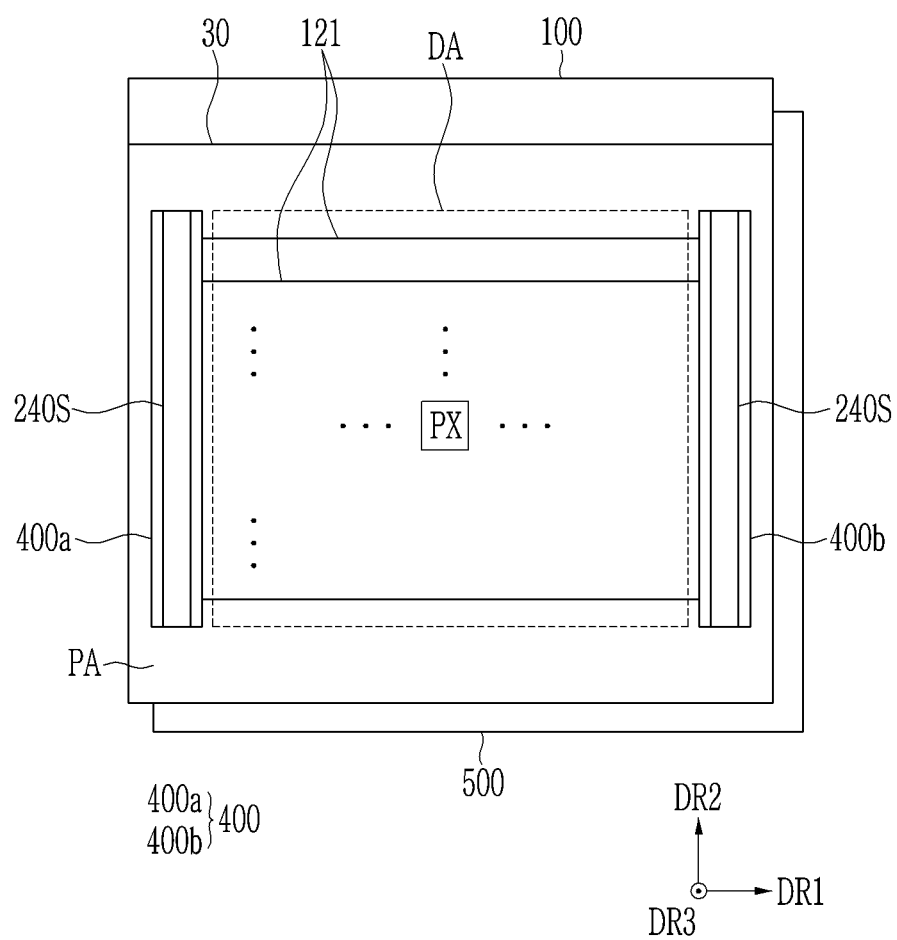
FIG. 1 is a layout view of a display device according to an exemplary embodiment of the present inventive concept.

The present inventive concept will be described more fully hereinafter with reference to the accompanying drawings, in which exemplary embodiments of the invention are shown. As those skilled in the art would realize, the described embodiments may be modified in various different ways, all without departing from the spirit or scope of the present inventive concept.

In order to clarify the present inventive concept, parts that are not connected with the description will be omitted, and the same elements or equivalents are referred to with the same reference numerals throughout the specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity. In the drawings, for better understanding and ease of description, the thickness of some layers and areas is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Throughout this specification and the claims which follow, a plane view means a view (referring to as "in a plan view") for observing a surface parallel to two directions (e.g., a first direction DR1 and a second direction DR2) crossing each other, and a cross-sectional view means a view (referring to as "in a cross-sectional view") for observing a surface cut in a direction (e.g., a third direction DR3) perpendicular to the surface parallel to the first direction and the second direction. Also, to overlap two constituent elements means that two constituent elements are overlapped in the third direction DR3 (e.g., a direction perpendicular to an upper surface of the substrate) unless stated otherwise, that is, are overlapped in a plan view.

Figure 2:
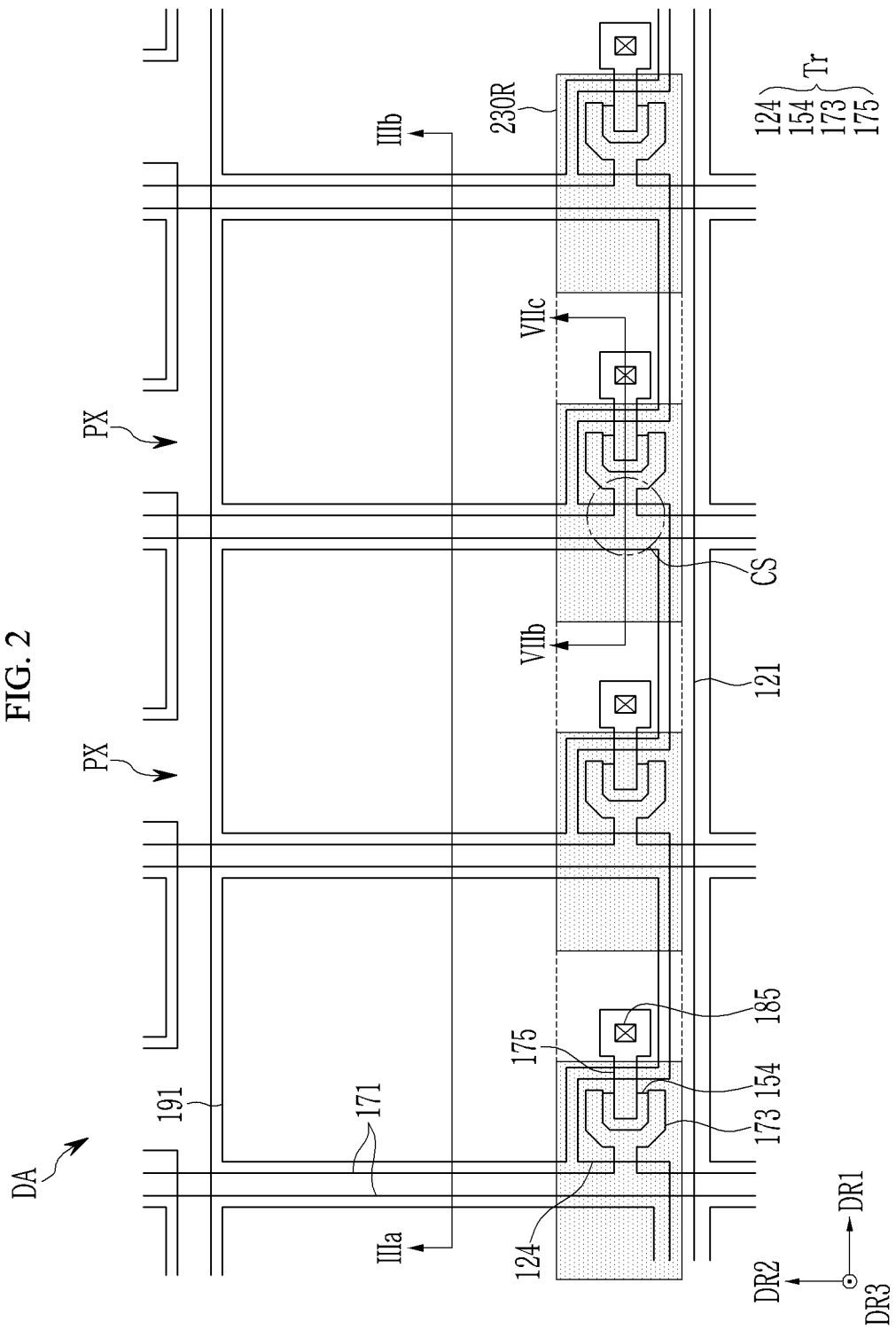
FIG. 2 is a top plan view of a plurality of pixels of a display device according to an exemplary embodiment of the present inventive concept.
Figure 3:
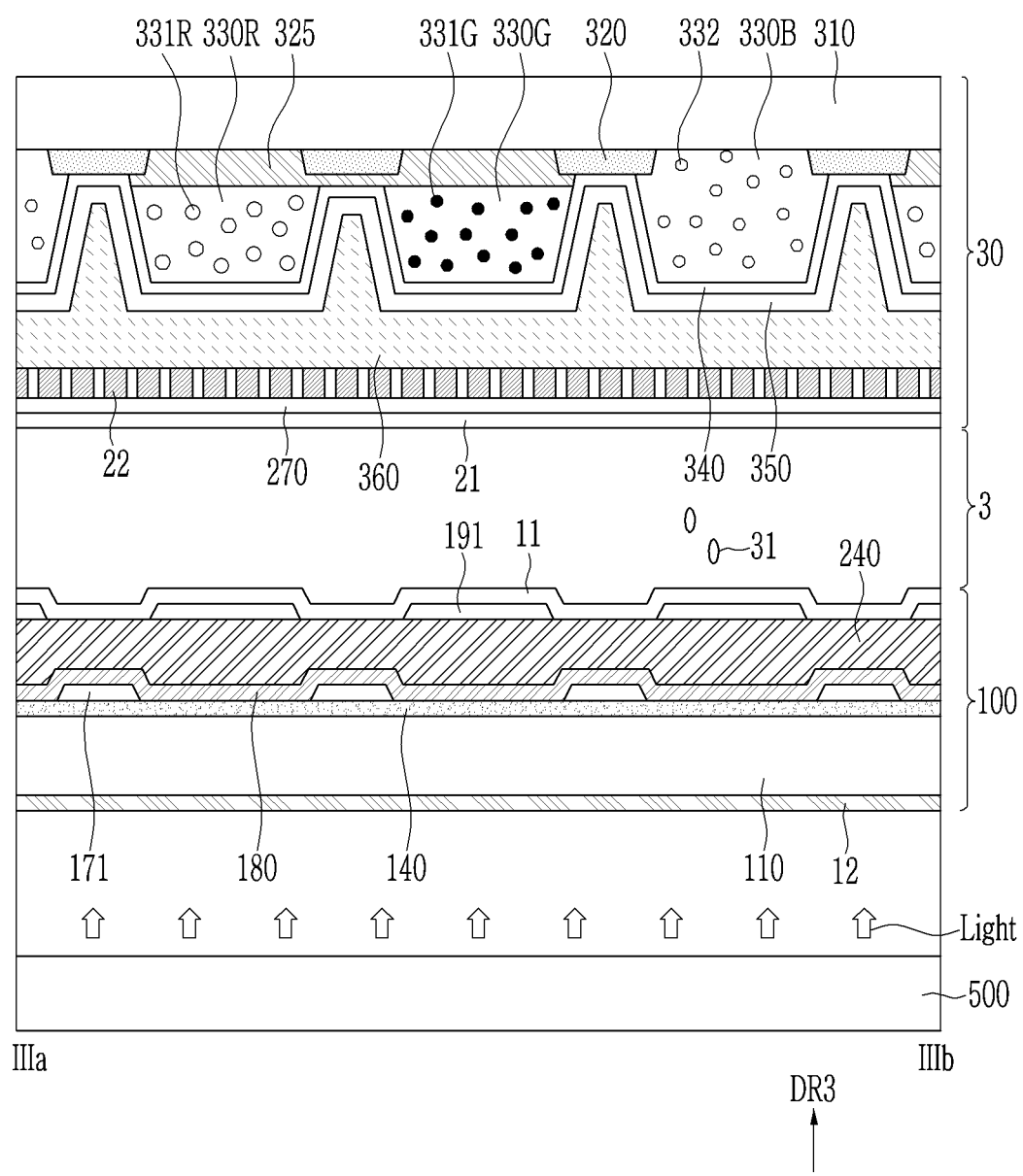
FIG. 3 is a cross-sectional view of the display device shown in FIG. 2 taken along a line IIIa-IIIb.

FIG. 1 is a layout view of a display device according to an exemplary embodiment of the present inventive concept, FIG. 2 is a top plan view of a plurality of pixels of a display device according to an exemplary embodiment of the present inventive concept, and FIG. 3 is a cross-sectional view of the display device shown in FIG. 2 taken along a line IIIa-IIIb.

Referring to FIG. 1, a display device according to an exemplary embodiment of the present inventive concept includes a display panel 100 and a color conversion panel 30 that are combined.

In a plan view, the display device may include a display area DA as an area mainly displaying an image, and a non-display area PA as an area disposed outside the display area DA and not displaying the image. In FIG. 1, the display area DA may correspond to a part inside a quadrangle displayed by a dotted line and the non-display area PA may correspond to a part outside the quadrangle displayed by the dotted line.

A plurality of pixel PX and a plurality of signal lines are disposed in the display area DA. Each pixel PX is a unit displaying the image and may include at least one transistor and at least one display electrode connected to the transistor. The signal lines include a plurality of gate lines 121. Each gate line 121 may extend in a first direction DR1. The gate line 121 may be connected to a control terminal of the transistor included in the pixel PX.

A driver may be disposed in the non-display area PA. As an example of the driver, there is a gate driver 400 capable of generating a gate signal to be applied to the gate line 121. The gate driver 400, as shown in FIG. 1, may include a first gate driver 400a and a second gate driver 400b disposed at respective sides of the display area DA. Alternatively, one of the first and second gate drivers 400a and 400b may be omitted.

The gate driver 400 includes a plurality of transistors. The transistors of the gate driver 400 may be formed through the same process as the transistors disposed in the display area DA. Accordingly, each terminal of the transistor of the gate driver 400 may be disposed at the same layer as each terminal of the transistor disposed in the display area DA, and may include the same material.

The display device according to an exemplary embodiment may further include a light unit 500. The light unit 500 may include a light source generating light (referred to first color light) having a first wavelength as a wavelength of a predetermined range, and a light guide (not shown) receiving the light generated from the light source to guide the light in a direction in which the display panel 100 and the color conversion panel 30 are disposed. The range of the first wavelength may be from about 400 nm to about 500 nm, for example, and may be within a blue wavelength range. In detail, the light unit 500 may include a light source emitting blue light. Any light source emitting blue light is possible, and, in one embodiment, the light unit 500 may include a blue light emitting diode (LED).

Referring to FIG. 2 and FIG. 3, the display device according to an exemplary embodiment may include the light unit 500, the display panel 100, a liquid crystal layer 3, and the color conversion panel 30 sequentially disposed from the bottom of the display device to the top of the display device. The light unit 500, the display panel 100, the liquid crystal layer 3, and the color conversion panel 30 overlap each other in a plan view. The liquid crystal layer 3 includes liquid crystal molecules 31.

The display panel 100 includes a substrate 110 having an insulating function and a gate conductive layer including a plurality of gate lines 121 disposed on an upper surface of the substrate 110. Each gate line 121 may substantially extend in the first direction DR1, and may include a plurality of gate electrodes 124.

A gate insulating layer 140 including an insulating material such as a silicon oxide, a silicon nitride, and a silicon oxynitride is disposed on the gate conductive layer, and a plurality of semiconductors 154 may be disposed thereon. The semiconductor 154 may include various semiconductor materials such as an amorphous, polysilicon, and/or oxide semiconductor material.

A data conductive layer including a plurality of data lines 171 and a plurality of drain electrodes 175 may be disposed on the gate insulating layer 140 and the semiconductor 154. Each data line 171 mainly extends in a second direction DR2 and may include a plurality of source electrodes 173. The drain electrode 175 may include an end portion facing a corresponding source electrode 173 and a quadrilateral expansion wider than the end portion along the second direction DR2 and with the contact hole 185 disposed in the expansion. The source electrode 173 and the drain electrode 175 are referred to as a data conductor.

The gate electrode 124, the semiconductor 154, the source electrode 173, and the drain electrode 175 may together form one transistor Tr. Among the semiconductor 154, a region that is disposed between the source electrode 173 and the drain electrode 175 and does not overlap the data conductive layer may be a channel region.

A passivation layer 180 including an insulating material such as a silicon oxide, a silicon nitride, and a silicon oxynitride may be disposed on the data conductive layer.

A plurality of shielding parts 230R are disposed on the passivation layer 180.

Each shielding part 230R includes a part covering the transistor disposed on the display panel 100, and particularly may cover the semiconductor 154 of the transistor, particularly the channel region of the semiconductor 154. The shielding part 230R may overlap the transistors disposed in the display area DA and the non-display area PA. In detail, the shielding part 230R may include a shielding part (indicated by "230R") disposed in the display area DA and a shielding part (indicated by "230Rd" later) disposed in the non-display area PA. FIG. 2 shows the shielding parts 230R covering the transistor Tr of the pixel PX disposed in the display area DA of the display panel 100. The shielding part covering the transistor of the non-display area PA is described later.

The shielding part 230R may include a material absorbing light of the first wavelength. The first wavelength may be in an approximate 400 nm to 500 nm range. For example, the shielding part 230R may absorb blue light, and for example, may be a red color filter that transmits red light.

The light unit 500 may emit light having the first wavelength, and in this case, the shielding part 230R may directly absorb the light emitted from the light unit 500 or the light reflected by a later-described second polarization layer 22. Any material that absorbs light of the first wavelength is usable for the shielding part 230R.

Referring to FIG. 2, in the display area DA, the shielding part 230R may include a plurality of parts separated from each other in the first direction DR1 in a plan view, each part extending in the first direction DR1. However, the shielding part 230R is not limited thereto, and each of the separated parts of the shielding part 230R may have an island shape. For example, a right part of each separated part of the shielding part 230R may overlap the transistor Tr of one pixel PX, and a left part may overlap another pixel PX adjacent thereto. Each separated part of the shielding part 230R may not overlap the expansion of the drain electrode 175.

Alternatively, in the display area DA, the shielding parts 230R corresponding to the pixels PX arranged in the first direction DR1 extend continuously in the first direction DR1 along the dotted line in FIG. 2, and form one continuous belt shape. In this case, the shielding part 230R may cover the gate line 121 and may extend to be parallel to the gate line 121.

The shape of the shielding part 230R is not limited to as shown, and it may have various other shapes.

Since a general light blocking member has a black color, a process of inspecting the transistor covered by the light blocking member is generally not easy during the manufacturing process of the display device. However, according to an embodiment of the present inventive concept, in the case where the shielding part 230R is provided with a black color, a position of the transistor may be easily confirmed during the manufacturing process of the display device, thereby simplifying the inspecting process.

The shielding part 230R prevents the light of the first wavelength reflected by the later-described second polarization layer 22 from being incident to the channel region of the transistor of the non-display area PA and the transistor Tr of the display area DA; thereby, performance of the transistor may be prevented from being deteriorated. A part of the light of the first wavelength emitted from the light unit 500 may be reflected in the second polarization layer 22, and a part of the reflected light may be incident into the transistor. Such incident light affects the channel region of the transistor such that a leakage current of the transistor may be increased. However, according to an exemplary embodiment of the present inventive concept, the shielding part 230R covers the transistor such that the light of the first wavelength incident to the channel region of the transistor is absorbed by the shielding part 230R, thereby preventing leakage current of the transistor in the display device and improving reliability.

An insulating layer 240 may be disposed on the shielding part 230R. The insulating layer 240 may include an organic material, may reduce a step due to a layer deposited under the insulating layer 240 in the display panel 100, and may prevent lifting and separation of constituent elements.

The insulating layer 240 and the passivation layer 180 may have a contact hole 185 disposed on the expansion of the drain electrode 175. When the shielding part 230R is continuously formed along one gate line 121 to be elongated, the shielding part 230R is removed over the contact hole 185 such that the shielding part 230R does not cover the contact hole 185.

A plurality of pixel electrodes 191 may be disposed on the insulating layer 240. Each pixel electrode 191 may be electrically connected to the drain electrode 175 through the contact hole 185. The pixel electrode 191 is shown in a planar shape, however it may be a slit-type pixel electrode including a plurality of slits.

A first alignment layer 11 may be disposed on the insulating layer 240 and the pixel electrode 191.

A plurality of spacers CS maintaining a cell gap in a third direction DR3 of the liquid crystal layer 3 may be disposed on the first alignment layer 11. The spacer CS may include at least one of a main spacer MCS having a height that is substantially the same as the cell gap that is a distance between the display panel 100 and the color conversion panel 30, and a sub-spacer SCS having a smaller height than the main spacer MCS. The spacer CS may be a column spacer. In a plan view, the spacer CS may overlap the shielding part 230R.

The display panel 100 may further include a first polarization layer 12 disposed on a lower surface of the substrate 110, that is, at the side closer to the light unit 500. The first polarization layer 12 may polarize (e.g., linearly polarize) the light emitted from the light unit 500. The first polarization layer 12 may include a coated polarization layer, a wire polarization layer, etc., and may be variously disposed on one surface of the display panel 100 as a film type, a coated type, an attached type, etc.

The color conversion panel 30 includes a substrate 310 overlapping the substrate 110 and having parallel surfaces.

A light blocking member 320 may be disposed between the substrate 310 and the display panel 100. That is, the light blocking member 320 may be disposed on the lower surface of the substrate 310. A plurality of color conversion layers 330R and 330G and transmissive layers 330B may be disposed between the light blocking member 320 and the display panel 100.

The light blocking member 320 may be disposed between the adjacent color conversion layers 330R and 330G and transmissive layers 330B, for example, between the first color conversion layer 330R and the second color conversion layer 330G, between the second color conversion layer 330G and the transmissive layer 330B, and between the transmissive layer 330B and the first color conversion layer 330R, to define the first color conversion layer 330R, the second color conversion layer 330G, and the transmissive layer 330B.

The light blocking member 320 may include a material absorbing the incident light or a material reflecting the light. For example, the light blocking member 320 may include a metal material. The light blocking member 320 reflects the light incident toward the light blocking member 320 from the first color conversion layer 330R, the second color conversion layer 330G, and the transmissive layer 330B back toward the respective first color conversion layer 330R, the second color conversion layer 330G, and the transmissive layer 330B, thereby improving light efficiency.

The first color conversion layer 330R may include a first semiconductor nanocrystal 331R and the second color conversion layer 330G may include a second semiconductor nanocrystal 331G. The light of the first wavelength incident to the first color conversion layer 330R is converted into light (referred to as "second color light") of a second wavelength by the first semiconductor nanocrystal 331R to be emitted from the first color conversion layer 330R. The light of the second wavelength may be red light. The light of the first wavelength incident to the second color conversion layer 330G is converted into light (referred to as "third color light") of a third wavelength by the second semiconductor nanocrystal 331G to be emitted from the second color conversion layer 330G. The light of the third wavelength may be green light.

The first semiconductor nanocrystal 331R includes at least one of a phosphor and a quantum dot converting the incident light of the first wavelength into the light of the second wavelength. The second semiconductor nanocrystal 331G includes at least one of a phosphor and a quantum dot converting the incident light of the first wavelength into the light of the third wavelength.

The quantum dot may be selected from a group II-VI compound, a group III-V compound, a group IV-VI compound, a group IV element, a group IV compound, and a combination thereof.

The II-VI group compound may be selected from a two-element compound selected from CdSe, CdTe, ZnS, ZnSe, ZnTe, ZnO, HgS, HgSe, HgTe, MgSe, MgS, and a mixture thereof; a three-element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The III-V group compound may be selected from a two-element compound selected from GaN, GaP, GaAs, GaSb, AN, AlP, AlAs, AlSb, InN, InP, InAs, InSb, and a mixture thereof; a three-element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a four-element compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof. The IV-VI group compound may be selected from a two-element compound selected from SnS, SnSe, SnTe, PbS, PbSe, PbTe, and a mixture thereof; a three-element compound selected from SnSeS, SnSeTe, SnSTe, PbSeS, PbSeTe, PbSTe, SnPbS, SnPbSe, SnPbTe, and a mixture thereof; and a four-element compound selected from SnPbSSe, SnPbSeTe, SnPbSTe, and a mixture thereof. The Group IV element may be selected from Si, Ge, and a mixture thereof. The Group IV compound may be a two-element compound selected from SiC, SiGe, and a mixture thereof.

In this case, the two-element compound, the three-element compound, or the four-element compound may exist in particles at a uniform concentration, or in the same particle while being divided to have partially different concentration distributions. Alternatively, they may have a core/shell structure where one quantum dot encloses another quantum dot.

An interface between the core and the shell may have a concentration gradient, such that a concentration of an element existing in the shell gradually decreases closer to a center of the interface.

The quantum dot may have a full width at half maximum (FWHM) of the light-emitting wavelength spectrum that is equal to or less than about 45 nm, preferably equal to or less than about 40 nm, and more preferably equal to or less than about 30 nm, and in this range, color purity or color reproducibility may be improved. In addition, since light emitted through the quantum dot is emitted in all directions, a viewing angle of light may be improved.

In addition, the quantum dot is not specifically limited to have shapes that are generally used in the technical field related to the present inventive concept, and more specifically, may have a shape such as a nano-particle having a spherical shape, a pyramid shape, a multi-arm shape, or a cubic shape, or may be a nanotube, a nanowire, a nanofiber, a planar nano-particle, etc.

The phosphor emitting the light (e.g., red light) of the second wavelength may contain one of (Ca, Sr, Ba)S, $(Ca, Sr, Ba)_2Si_5N_8$, $CaAlSiN_3$, $CaMoO_4$, and $Eu_2Si_5N_8$, but is not limited thereto.

The phosphor emitting the light (e.g., green light) of the third wavelength may contain one of yttrium aluminum garnet (YAG), $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON, and $(Sr1-xBax)Si_2O_2N_2$, but the present disclosure is not limited thereto. The second color conversion layer 330G may include at least one kind of green phosphor. In this case, the x may be a random number between 0 and 1.

The transmissive layer 330B may emit the incident light. That is, the transmissive layer 330B may emit the light of the first wavelength. The transmissive layer 330B may include a polymer material transmitting the light of the first wavelength supplied from the light unit 500. The region where the transmissive layer 330B is disposed may correspond to the region emitting blue, and the transmissive layer 330B may pass the incident light of the first wavelength as it is without separately including the semiconductor nanocrystal.

The transmissive layer 330B may include a scatterer 332. The scatterer 332 scatters the light incident to the transmissive layer 330B to increase an amount of the light emitted from the transmissive layer 330B, or to make front luminance and lateral luminance uniform.

Although not shown, to scatter the incident light, at least one layer among the first color conversion layer 330R and the second color conversion layer 330G may further include a scatterer. The scatterer, as an example, may include at least one selected from $TiO_2$, $Al_2O_3$, and $SiO_2$, but it is not limited thereto.

The transmissive layer 330B may further include at least one of a pigment and a dye of a color (e.g., blue) of the first wavelength. For example, the pigment and the dye included in the transmissive layer 330B absorbs at least one of the red light and the green light, thereby preventing deterioration of the color reproducibility due to the reflection of the external light.

A first color light cutting filter 325 may be disposed between the substrate 310 considered with the light blocking member 320 and the color conversion layers 330R and 330G. The first color light cutting filter 325 may exist only in the region overlapping the first color conversion layer 330R and the second color conversion layer 330G, but may not be disposed in the region overlapping the transmissive layer 330B. The first color light may be the blue light.

The first color light cutting filter 325, as shown in FIG. 3, may be connected between the part overlapping the first color conversion layer 330R and the part overlapping the second color conversion layer 330G. However, it is not limited thereto, and the first color light cutting filter 325 overlapping the first color conversion layer 330R and the first color light cutting filter 325 overlapping the second color conversion layer 330G may be divided to be separated from each other.

The first color light cutting filter 325 may absorb the light of the first wavelength supplied from the light unit 500. The light incident from the light unit 500 to the color conversion panel 30 is converted into light of the first wavelength or light of other colors (e.g., red or green) by the semiconductor nanocrystals 331R and 331G in the first color conversion layer 330R and the second color conversion layer 330G, and in this case, some of the light of the first wavelength may not be changed and may be emitted through the substrate 310. To prevent this, the first color light cutting filter 325 may have a structure of a single layer or a multi-layer. In this case, the first color light cutting filter 325 may only be disposed on the region emitting red and green and may not be disposed on the region emitting blue.

The first color light cutting filter 325 may also include any material to perform the above-described effects, and as an example, it may include a yellow color filter transmitting yellow light.

A capping layer 340 may be disposed between the first color conversion layer 330R, the second color conversion layer 330G, and the transmissive layer 330B, and the liquid crystal layer 3.

The capping layer 340 may prevent the first color conversion layer 330R, the second color conversion layer 330G, and the transmissive layer 330B from being damaged by processes after forming the first color conversion layer 330R, the second color conversion layer 330G, and the transmissive layer 330B The semiconductor nanocrystals 331R and 331G included in the first color conversion layer 330R and the second color conversion layer 330G may be damaged or quenched by moisture and a high temperature process, and the capping layer 340 may prevent these problems.

A light filter layer 350 may be disposed between the capping layer 340 and the liquid crystal layer 3. The light filter layer 350 reflects the light generated in the first color conversion layer 330R and the second color conversion layer 330G, thereby increasing light efficiency.

The light filter layer 350 may include a plurality of layers. In this case, the plurality of layers may have a structure in which layers with different refractive indexes are alternately arranged in a direction substantially perpendicular to the substrate 110. The light filter layer 350 formed by alternately arranging the layers having the different refractive indexes from each other may include a multi-layered structure of about ten layers to twenty layers, but it is not limited thereto.

At least one of the capping layer 340 and the light filter layer 350 may be omitted according to another embodiment. Particularly, when the layer most adjacent to the capping layer 340 among the plurality of layers forming the light filter layer 350 is formed of a silicon nitride, the capping layer 340 may be omitted.

A planarization layer 360 may be disposed between the light filter layer 350 and the liquid crystal layer 3. The planarization layer 360 reduces a step of the constituent elements disposed between the planarization layer 360 and the substrate 310 to flatten the lower surface.

A second polarization layer 22 may be disposed between the planarization layer 360 and the liquid crystal layer 3. The second polarization layer 22 may polarize the light passing through the light unit 500, the display panel 100, and the liquid crystal layer 3. The second polarization layer 22 may be the coated polarization layer, the wire grid polarization layer, etc.

The second polarization layer 22 may include a metal material and may have reflectance. The second polarization layer 22 may include a plurality of nano-patterns according to an exemplary embodiment and a width of each nano-pattern may be a unit of several nanometers. The second polarization layer 22 may further include an inorganic material layer (e.g., a silicon oxide, a silicon nitride) disposed on and/or under the layer of the metal material.

Since the second polarization layer 22 includes the metal material, the light of the first wavelength emitted from the light unit 500 may be again reflected in the display panel 100 direction by the second polarization layer 22. A part of the reflected light may be incident to the transistor side. However, since the display panel 100 according to an exemplary embodiment of the present inventive concept includes the shielding part 230R covering the transistor, the light of the first wavelength reflected in the transistor direction may be absorbed. Accordingly, leakage current caused by the light of the first wavelength affecting the channel region of the transistor may be prevented and the display device with improved reliability may be provided.

A common electrode 270 and a second alignment layer 21 may be sequentially disposed between the second polarization layer 22 and the liquid crystal layer 3. The common electrode 270 receiving a common voltage may form an electric field to the liquid crystal layer 3 along with the pixel electrode 191. According to another exemplary embodiment, the common electrode 270 may be disposed in the display panel 100. The second alignment layer 21 may include the same material as the first alignment layer 11 and may be formed through the same process.

As above-described, since the display device according to an exemplary embodiment includes the light unit 500 providing the light of the first wavelength like the blue light and the color conversion layers 330R and 330G emitting the light of the second wavelength and the third wavelength like the red light and the green light, the light with improved color purity may be provided. As the second polarization layer 22 included in the color conversion panel 30 is provided with the thin thickness of several nanometers, a path through which light passes is short such that distortion of the light may be minimized. Also, the light of the first wavelength that may be reflected from the second polarization layer 22 and then incident to the transistor of the display panel 100 is absorbed by the shielding part 230R covering the transistor such that the performance deterioration of the transistor may be prevented.

The non-display area PA of the display panel 100 is now described with reference to FIG. 4 to FIG. 6 along with FIG. 1 to FIG. 3.

Figure 4:
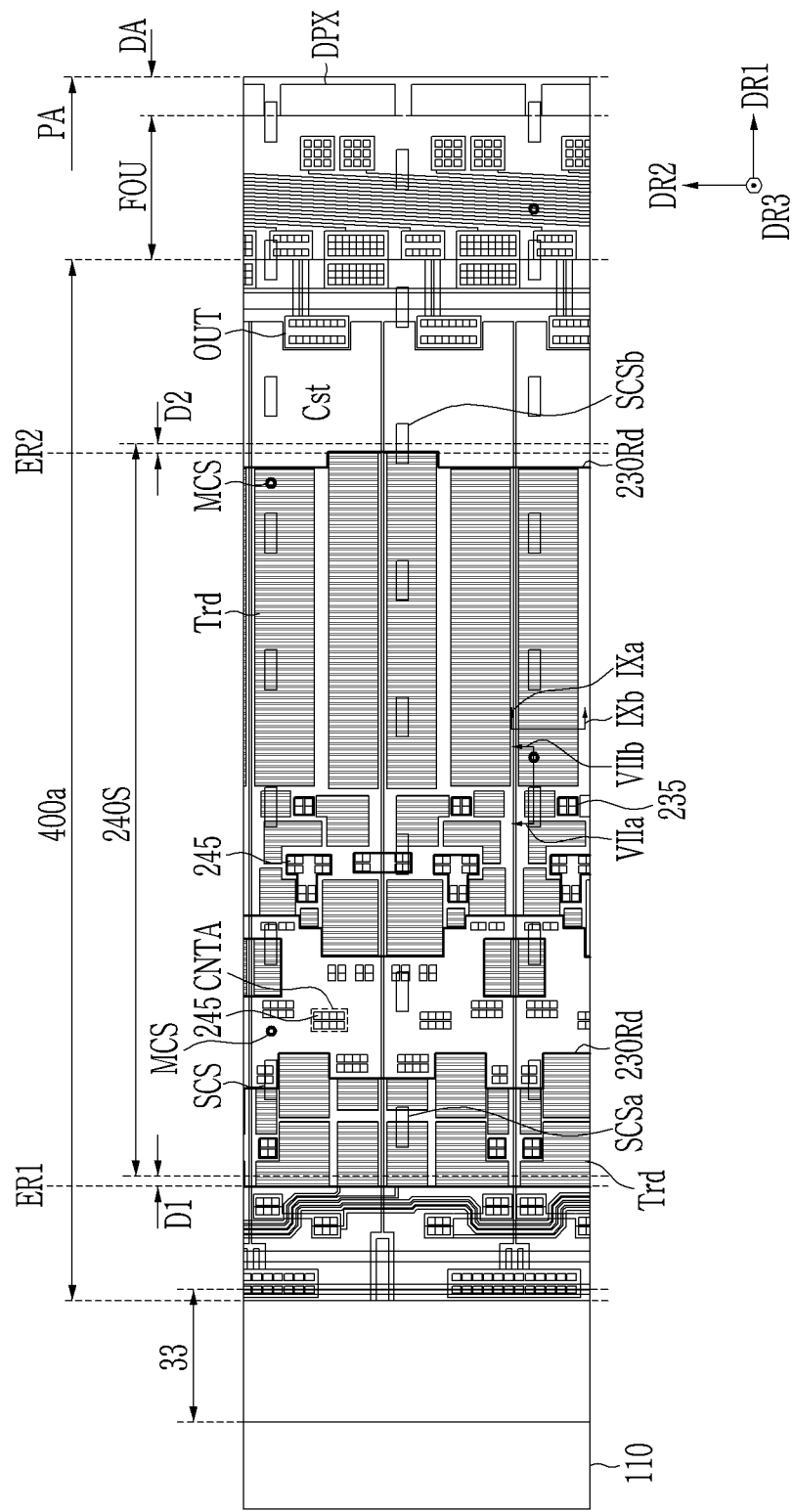
FIG. 4, FIG. 5, and FIG. 6 are top plan views for a non-display area of a display device according to an exemplary embodiment of the present inventive concept.
Figure 5:
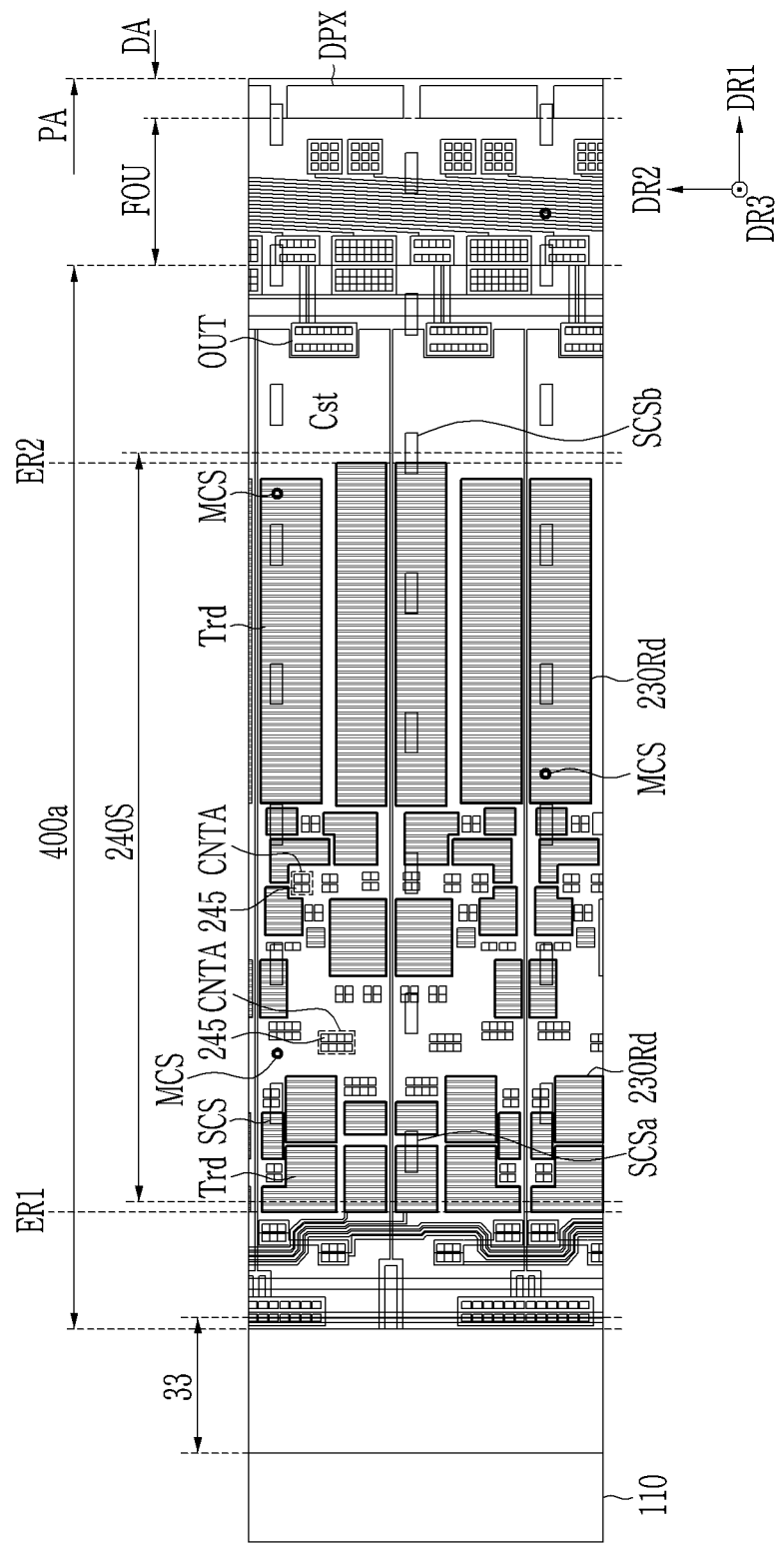
Figure 6:
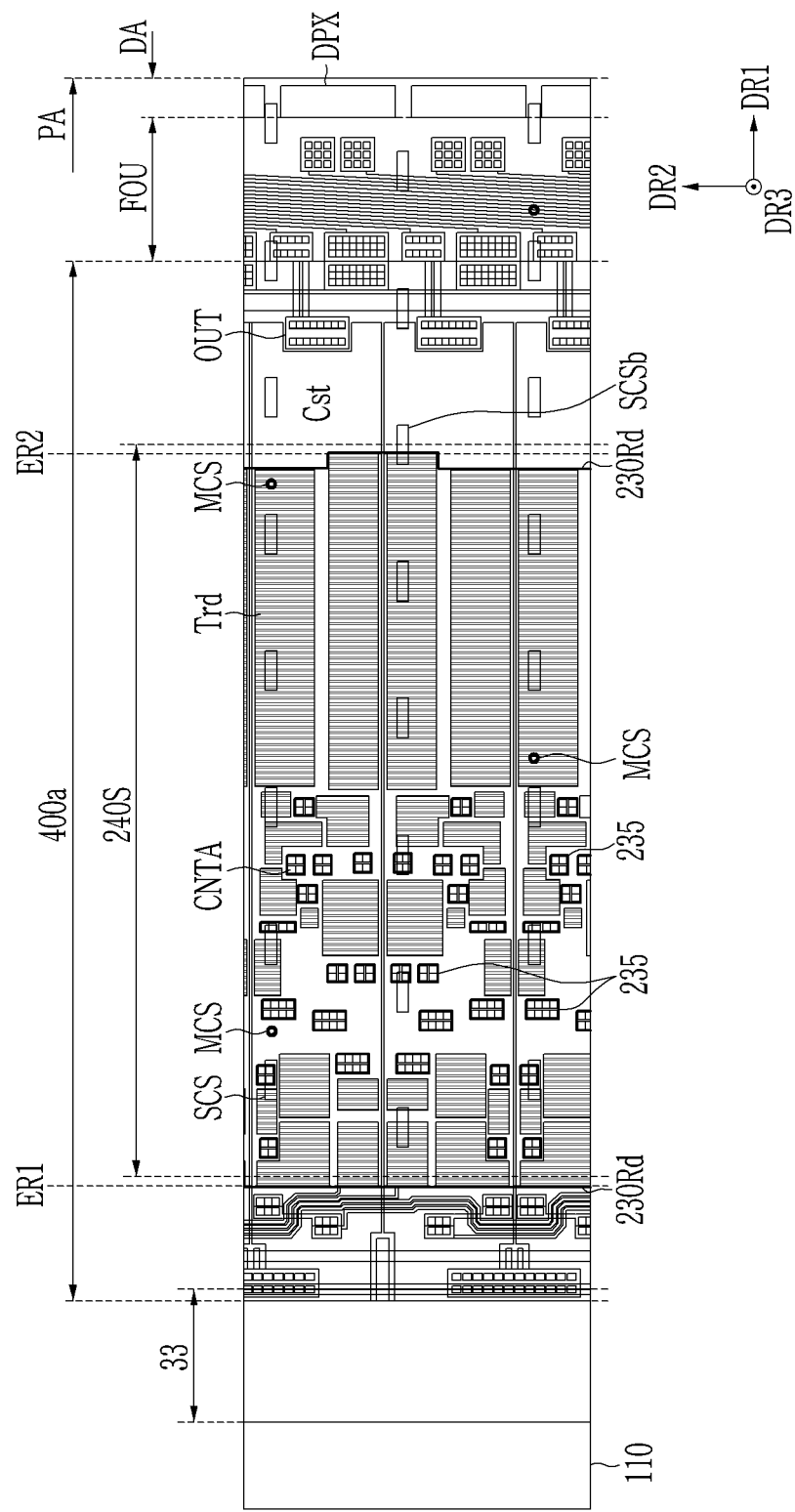

FIG. 4, FIG. 5, and FIG. 6 are top plan views for a non-display area of a display device according to an exemplary embodiment of the present inventive concept.

As above-described, the gate drivers 400a and 400b may be disposed in the non-display area PA, and a sealant 33 for sealing the liquid crystal layer 3 between the gate drivers 400a and 400b and the edge of the substrate 110 may be disposed. The sealant 33 is continuously formed along the circumference of the display area DA, thereby forming a closed-curve line shape. A signal line arrangement part FOU where gate signal lines connected to the gate drivers 400a and 400b are disposed may be disposed between the gate drivers 400a and 400b and the display area DA. A dummy pixel DPX including a pixel electrode 191 may be disposed between the signal line arrangement part FOU and the display area DA. The dummy pixels DPX are arranged in the second direction DR2 while forming one or more columns.

FIG. 4 to FIG. 6 show the gate driver 400a disposed at the left side among the gate drivers 400a and 400b. Hereinafter, the gate driver 400a is described, and the same description may also be applied to the gate driver 400b.

The gate driver 400a includes a plurality of stages arranged in the second direction DR2, and each stage includes a plurality of transistors Trd, at least one capacitor Cst, and an output stage OUT outputting the gate signal. FIG. 4 to FIG. 6 substantially show three stages and three output stages OUT. The signal line connected to the output stage OUT may be connected to the gate line disposed in the display area DA through the signal line arrangement part FOU.

Figure 7:
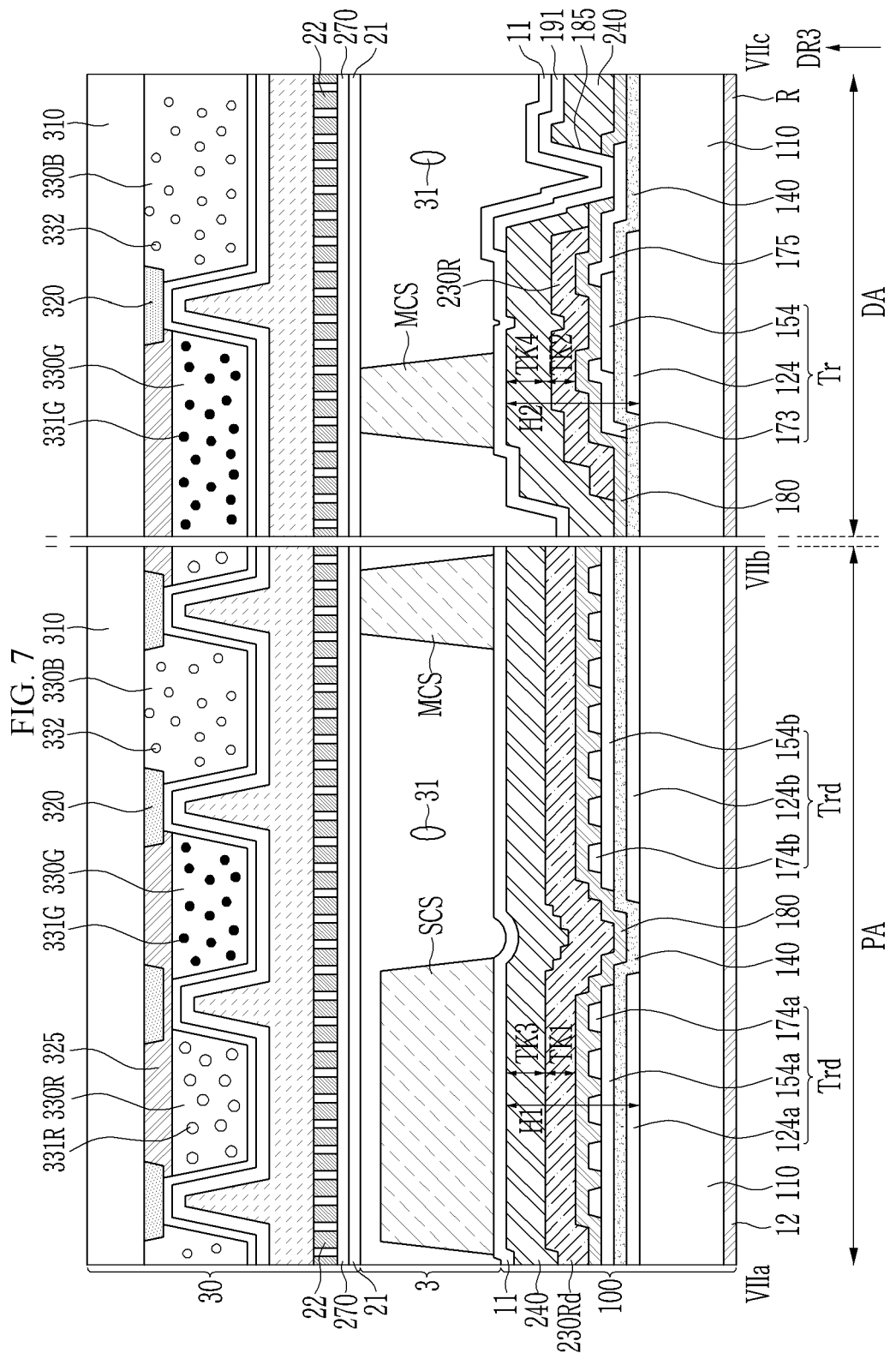
FIG. 7 and FIG. 8 are cross-sectional view of a display device according to an exemplary embodiment of the present inventive concept taken along lines VIIa-VIIb of FIG. 4 and VIIb-VIIc of FIG. 2.
Figure 8:
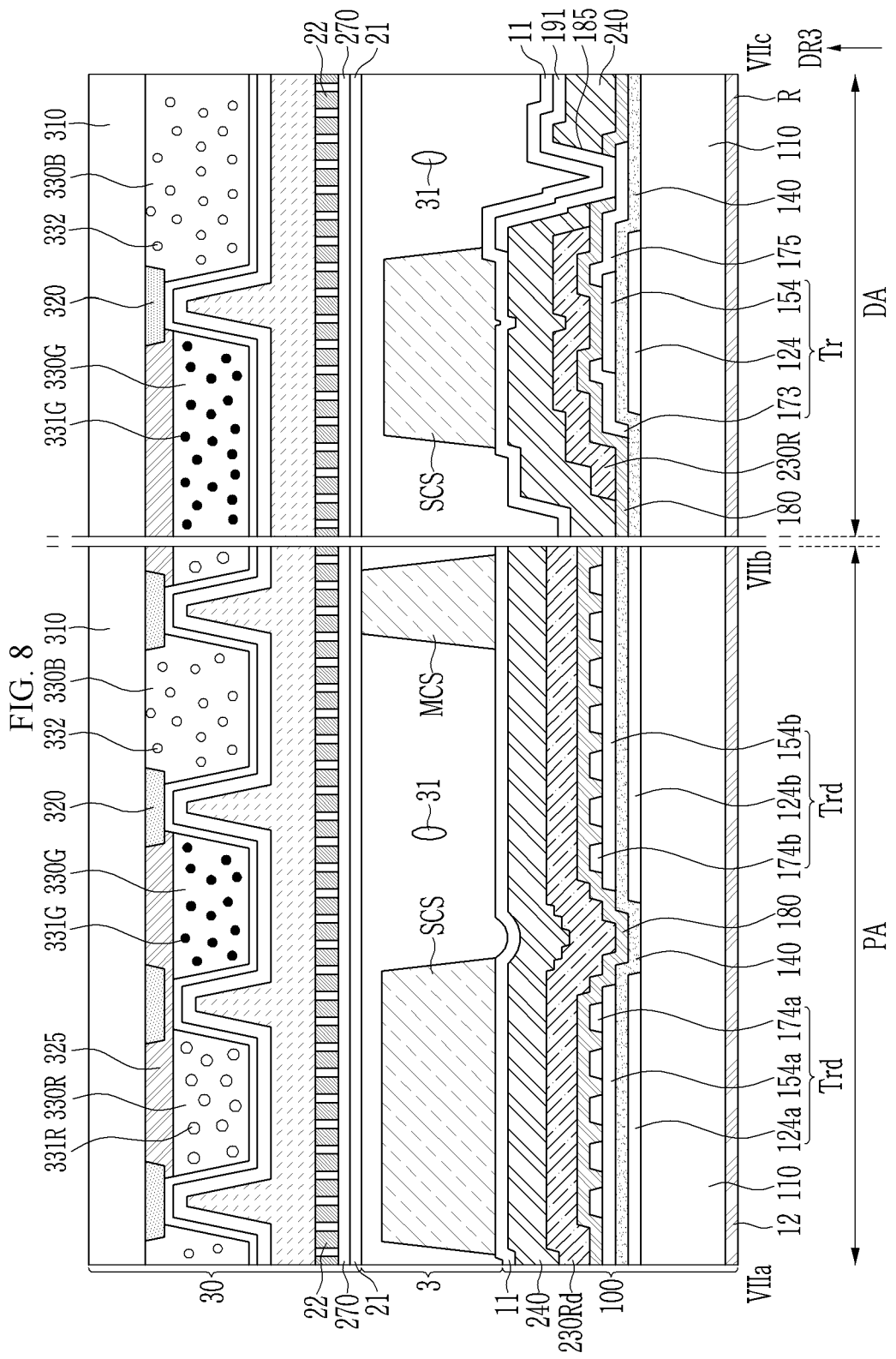

FIG. 7 and FIG. 8 are cross-sectional views of a display device according to an exemplary embodiment of the present inventive concept taken along lines VIIa-VIIb of FIG. 4 and VIIb-VIIc of FIG. 2.

Referring to FIG. 7 and FIG. 8 along with FIG. 2 and FIG. 4 to FIG. 6, a gate conductive layer including gate electrodes 124a and 124b disposed in the non-display area PA and semiconductors 154a and 154b disposed at the same layer as the semiconductor 154 of the display area DA are disposed on the gate insulating layer 140, and a data conductive layer may include data conductors 174a and 174b overlapping the semiconductors 154a and 154b.

The gate electrode 124a, the semiconductor 154a, and the data conductor 174a overlapping each other may together form one transistor Trd, and the gate electrode 124b, the semiconductor 154b, and the data conductor 174b overlapping each other may together form another transistor Trd.

In FIG. 4 to FIG. 6, the portion shown by a plurality of longitudinal lines as a region where the transistor Trd is formed is a region where the data conductors 174a and 174b overlapping the semiconductors 154a and 154b of the transistor Trd are formed. Some of the data conductors 174a and 174b included in one transistor Trd may function as a source electrode and the rest may function as a drain electrode. Among the semiconductors 154a and 154b, the region disposed between the data conductors 174a and 174b may be the channel region of the transistor Trd.

The transistor Tr of the display area DA and the transistor Trd of the non-display area PA may be simultaneously formed in the same process.

A passivation layer 180 is disposed on the data conductors 174a and 174b, and a plurality of shielding parts 230Rd are positioned on the passivation layer 180. The shielding part 230Rd is disposed at the same layer as the shielding part 230R disposed in the display area DA and includes the same material, and are formed in the same process. The shielding part 230Rd covers the transistor Trd like the shielding part 230R disposed in the display area DA, and may overlap the semiconductors 154a and 154b of the transistor and cover the semiconductors 154a and 154b.

Referring to FIG. 4, in a plan view, the shielding part 230Rd may overlap most of the region of the transistors Trd included in the gate driver 400a, and the shielding parts 230Rd respectively overlapping the adjacent transistors Trd may be substantially connected to each other. The shielding part 230Rd is removed in the contact part CNTA where one or a plurality of adjacent contact holes are gathered, thereby having an opening 235 overlapping the contact part CNTA.

Referring to FIG. 5, unlike the embodiment shown in FIG. 4, the shielding parts 230Rd respectively overlapping the adjacent transistors Trd may be separated from each other. The shielding parts 230Rd respectively overlapping the adjacent transistors Trd are connected, however the upper surface of the shielding part 230Rd may be concave on the boundary therebetween.

Referring to FIG. 6, in a plan view, one continuous shielding part 230Rd may overlap most of the transistors Trd included in one gate driver 400a. The shielding part 230Rd is removed in the contact part CNTA where one or a plurality of adjacent contact holes are gathered, thereby including the opening 235 overlapping the contact part CNTA.

A separation distance between an edge ER1 close to the edge of the substrate 110 among the edge of the region where the shielding parts 230Rd are formed and the sealant 33 may be about 200 μm to about 300 μm, and this value may be changed according to design conditions.

Referring to FIG. 7 and FIG. 8, a thickness TK1 in the third direction DR3 of the shielding part 230Rd disposed in the non-display area PA and overlapping the transistor Trd may be larger than a thickness TK2 in the third direction DR3 of the shielding part 230R disposed in the display area DA and overlapping the transistor Tr. An average thickness in the non-display area PA of the shielding part 230Rd may be larger than an average thickness of the shielding part 230R of the display area DA. In detail, a minimum thickness TK1 (which may be at a part overlapping the semiconductor and the data conductor of the transistor Trd, and is not 0) of the shielding part 230Rd corresponding to the semiconductors 154a and 154b in the non-display area PA may be larger than the minimum thickness TK2 (which may be at a part overlapping the semiconductor and the source/drain electrode of the transistor Tr, and is not 0) of the shielding part 230R corresponding to the semiconductor 154 disposed in the display area DA. That is, the thickness TK1 (which may be at a part overlapping the semiconductor and the data conductor of the transistor Trd) of the shielding part 230Rd corresponding to the upper surface furthest from the substrate 110 among the upper surface of the shielding part 230Rd in the non-display area PA may be larger than the thickness TK2 (which may be at the part overlapping the semiconductor and the source/drain electrode of the transistor Tr) of the shielding part 230R corresponding to the upper surface furthest from the substrate 110 among the upper surface of the shielding part 230R disposed in the display area DA.

Referring to one of embodiments as shown in FIG. 2, and FIG. 4 to FIG. 6, a density of the region occupied with the transistor Trd disposed in the gate driver 400a in the non-display area PA is very much higher than the density of the region occupied with the transistor Tr disposed in the display area DA, and a remaining amount of the shielding part 230Rd may be more than the shielding part 230R in a developing step when forming the shielding parts 230R and 230Rd by a photolithography process. Therefore, it is highly likely that the thickness TK1 of the shielding part 230Rd is larger than the thickness TK2 of the shielding part 230R.

Characteristics and effects of the shielding part 230Rd may otherwise be the same as the characteristics and the effects of the above-described shielding part 230R. That is, the shielding part 230Rd may include a material absorbing the light of the first wavelength, and for example, the material may be a red color filter. Also, the shielding part 230Rd may directly absorb the light from the light unit 500 and may absorb the light reflected by the second polarization layer 22.

An insulating layer 240 may be disposed on the shielding part 230Rd. The insulating layer 240 may be continuously formed in the display area DA and the non-display area PA except for a partially removed part. The insulating layer 240 may be removed in the contact hole of the contact part CNTA.

Referring to FIG. 7 and FIG. 8, the thickness TK3 in the third direction DR3 of the insulating layer 240 disposed in the non-display area PA may be smaller than the thickness TK4 in the third direction DR3 of the insulating layer 240 disposed in the display area DA. The average thickness in the third direction DR3 of the insulating layer 240 disposed in the non-display area PA may be smaller than the average thickness in the third direction DR3 of the insulating layer 240 disposed in the display area DA. In detail, the minimum thickness TK3 of the insulating layer 240 in the non-display area PA may be smaller than the minimum thickness TK4 of the insulating layer 240 disposed in the display area DA. A difference between the thickness TK3 and the thickness TK4, for example, may be about 0.5 μm to about 1.5 μm, however it is not limited thereto. The thickness TK3 of the insulating layer 240 on the shielding part 230Rd having the upper surface furthest from the substrate 110 in the non-display area PA may be smaller than the thickness TK4 of the insulating layer 240 on the shielding part 230R having the upper surface furthest from the substrate 110 in the display area DA.

The thickness in the third direction DR3 of the insulating layer 240 may be differentiated depending on the position in the display panel 100, and the thickness of the insulating layer 240 may also be differentiated in the non-display area PA.

Referring to FIG. 4 to FIG. 6 along with FIG. 1 described above, regions corresponding to the partial or entire region where the gate drivers 400a and 400b are disposed may be a thickness differential region 240S of the insulating layer 240. The average thickness in the third direction DR3 of the insulating layer 240 in the thickness differential region 240S among the non-display area PA may be smaller than the average thickness in the third direction DR3 of the insulating layer 240 in the region except for the thickness differential region 240S. Also, the average thickness of the third direction DR3 of the insulating layer 240 in the thickness differential region 240S may be smaller than the average thickness in the third direction DR3 of the insulating layer 240 in the display area DA.

A sum of the minimum thickness TK1 of the shielding part 230Rd and the minimum thickness TK3 of the insulating layer 240 in the thickness differential region 240S may be substantially the same as a sum of the minimum thickness TK2 of the shielding part 230R and the minimum thickness TK4 of the insulating layer 240 in the display area DA. Thus, distance H1 from the upper surface of the insulating layer 240 overlapping the shielding part 230Rd in a plan view in the thickness differential region 240S disposed in the non-display area PA to the upper surface of the substrate 110 is substantially the same as distance H2 from the upper surface of the insulating layer 240 overlapping the shielding part 230R in a plan view in the display area DA to the upper surface of the substrate 110.

Referring to FIG. 1 and FIG. 4, the thickness differential region 240S may overlap most of the transistors Trd included in the gate driver 400*a*, may be continuously formed, and may be elongated to extend along the second direction DR2.

A distance D1 between one edge ER1 of the shielding part 230Rd and the edge of the thickness differential region 240S adjacent thereto and a distance D2 between another edge ER2 of the shielding part 230Rd and the edge of the thickness differential region 240S adjacent thereto may be about 10 µm to about 30 µm, however it is not limited thereto. Particularly, the edge close to the display area DA among the edge of the thickness differential region 240S may be closer to the display area DA than the edge ER2 of the shielding part 230Rd. Also, the edge ER2 of the shielding part 230Rd may be disposed inside the thickness differential region 240S.

Referring to FIG. 1 and FIG. 4 to FIG. 6, the thickness differential region 240S may be respectively disposed on both sides based on the display area DA, and each thickness differential region 240S may extend in the second direction DR2.

Although not shown, in the non-display area PA, a plurality of conductive connecting members may be disposed at the same layer as the pixel electrode 191 on the insulating layer 240, and the conductive connecting member may electrically connect two different layers from each other through the contact hole of the contact part CNTA.

Referring to FIG. 4, FIG. 7, and FIG. 8 along with FIG. 2 described above, the spacers CS disposed on the first alignment layer 11 include a plurality of main spacers MCS and sub-spacers SCS disposed in the display area DA and the non-display area PA.

Most of the spacers MCS and SCS overlapping the gate driver 400*a* in the non-display area PA may overlap the transistor Trd, the shielding part 230Rd, and the thickness differential region 240S. The spacers MCS and SCS overlapping the transistor Trd may overlap the thickness differential region 240S.

The height in the third direction DR3 of the main spacer MCS disposed in the display area DA and the height in the third direction DR3 of the main spacer MCS disposed in the non-display area PA may be about the same as each other. The height in the third direction DR3 of the sub-spacer SCS disposed in the display area DA and the height in the third direction DR3 of the sub-spacer SCS disposed in the non-display area PA may be about the same as each other.

As above-described, the thickness TK1 in the third direction DR3 of the shielding part 230Rd disposed on the transistor Trd may be thicker than the thickness TK2 in the third direction DR3 of the shielding part 230R disposed on the transistor Tr of the display area DA, depending on the dense arrangement of the transistor Trd in the non-display area PA.

If there is no thickness differential region 240S, the thickness of the shielding part 230Rd overlapping the transistor Trd in the region of the gate driver 400*a* would be thicker than the shielding part 230R of the display area DA, and the thickness of the insulating layer 240 disposed on the shielding parts 230R and 230Rd may also be formed to be substantially the same in the display area DA and the non-display area PA. Accordingly, as the upper surface of the spacers MCS and SCS disposed on the transistor Trd in the non-display area PA is higher than the upper surface of the spacers MCS and SCS of the display area DA, a stain failure may be generated by the difference of the cell gap of the liquid crystal layer 3 near the boundary of the non-display area PA and the display area DA of the display panel 100.

According to an exemplary embodiment of the present inventive concept, since the insulating layer 240 overlapping the shielding part 230Rd disposed in the non-display area PA is formed with the relatively thin thickness, the height of the upper surface of the insulating layer 240 based on the upper surface of the substrate 110 may be constant in the display area DA and the non-display area PA. Accordingly, the height (based on the upper surface of the substrate 110) of the upper surface of the main spacer MCS overlapping the transistor Trd in the non-display area PA may be substantially the same as the height (based on the upper surface of the substrate 110) of the upper surface of the main spacer MCS disposed in the display area DA. Accordingly, the cell gap in the third direction DR3 of the liquid crystal layer 3 in the non-display area PA may be substantially the same as the cell gap in the third direction DR3 of the liquid crystal layer 3 in the display area DA, and the stain failure due to the difference of the cell gap of the liquid crystal layer 3 may be prevented near the boundary of the non-display area PA and the display area DA.

Referring to FIG. 4, the distance in the first direction DR1 between the spacer SCSA disposed closest to the edge of the substrate 110 and the edge ER1 of the shielding part 230Rd is larger than 0, for example, about 50 µm to about 150 µm; however the distance is not limited thereto. Since the right edge ER2 of the shielding part 230Rd is disposed inside the thickness differential region 240S, the upper surface having the highest height of the spacer SCSb overlapping the edge ER2 of the shielding part 230Rd may not be higher than the upper surface of the spacer SCSa.

Referring to FIG. 8, the spacer CS shown in FIG. 2 may be the sub-spacer SCS that is not the main spacer MCS.

Figure 9:
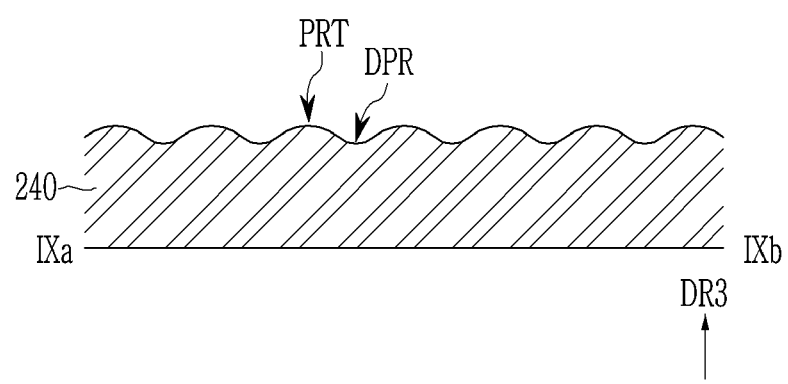
FIG. 9 is a cross-sectional view of a display device according to an exemplary embodiment of the present inventive concept taken along a line IXa-IXb of FIG. 4, showing only an insulating layer.

FIG. 9 is a cross-sectional view of a display device according to an exemplary embodiment of the present inventive concept taken along a line IXa-IXb of FIG. 4, showing only an insulating layer 240.

Referring to FIG. 9, the upper surface of the insulating layer 240 may be substantially flat in the thickness differential region 240S, however it may have protrusions and depressions including a recess portion DPR and a convex portion PRT on the cross-section taken along a predetermined direction. The direction in which the plurality of recess portions DPR and the plurality of convex portions PRT are alternately arranged may be the second direction DR2, for example, however it is not limited thereto.

Figure 10:
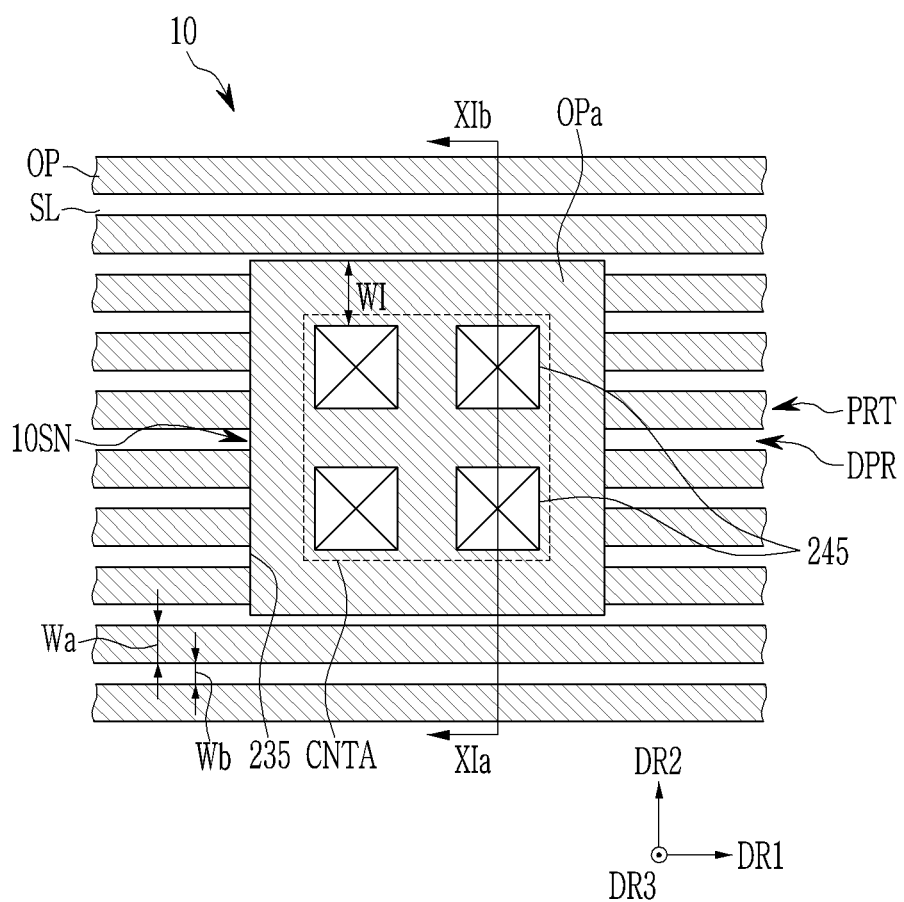
FIG. 10 is a top plan view showing a shape of a contact part disposed at a non-display area of a display device according to an exemplary embodiment of the present inventive concept and a photo-mask.
Figure 11:
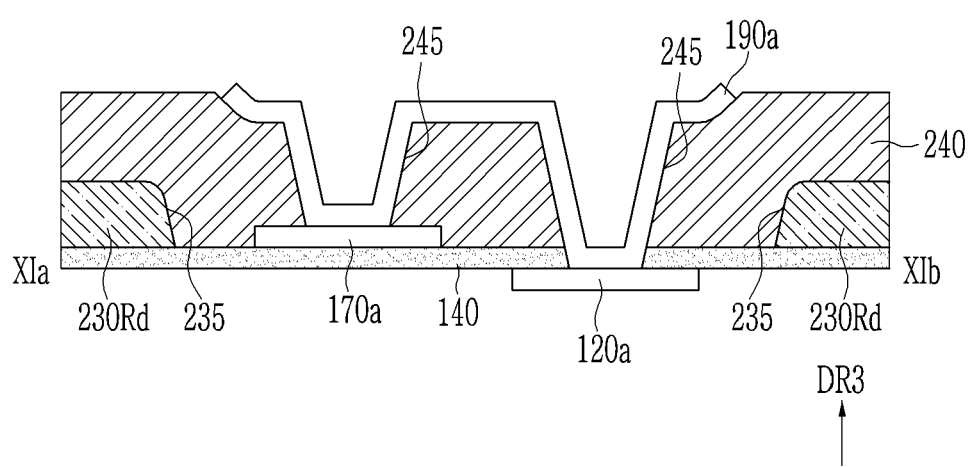
FIG. 11 and FIG. 12 are partial cross-sectional views of the display device shown in FIG. 10 taken along a line XIa-XIb.
Figure 12:
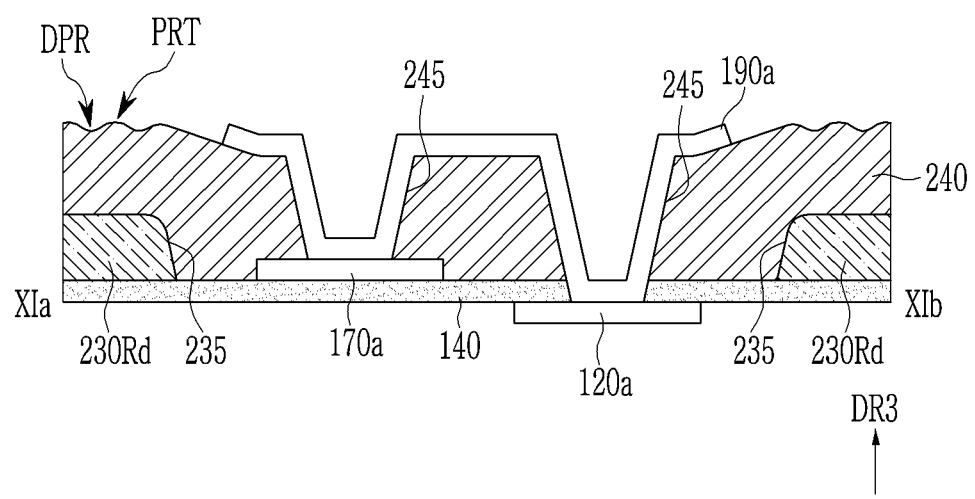

FIG. 10 is a top plan view showing a shape of a contact part disposed at a non-display area of a display device according to an exemplary embodiment of the present inventive concept and a photo-mask, and FIG. 11 and FIG. 12 are partial cross-sectional views of the display device shown in FIG. 10 taken along a line XIa-XIb.

FIG. 10 shows a plan structure of the contact part CNTA including contact holes 245 adjacent to the region of the gate driver 400*a* shown in FIG. 4 and a plan structure of a photo-mask 10 for forming the insulating layer 240.

Two conductive layers 120*a* and 170*a* disposed at different layers in the gate driver 400*a* may be electrically connected through a connecting member 190*a* disposed at the same layer as the pixel electrode 191 in the contact hole 245.

The shielding part 230Rd is removed on the contact part CNTA and a predetermined region therearound, thereby forming the opening 235. A distance W1 between the edges of the openings 235 of the contact hole 245 and the shielding part 230Rd is larger than 0, for example, about 5 µm to about 10 µm, however it is not limited thereto.

When forming the insulating layer 240, the photolithography process using the photo-mask 10 may be used, and in this case, a photo-mask 10 corresponding to the thickness differential region 240S may have a slit structure to reduce the thickness of the insulating layer 240 of the part overlapping the shielding part 230Rd according to an exemplary embodiment of the present inventive concept. For example, the photo-mask 10 corresponding to the thickness differential region 240S may include a light blocking part OP and a transparent slit part SL that are alternately arranged. The slit part SL, for example, may extend parallel to the first direction DR1.

The part hatched by a slanting line in FIG. 10 corresponds to the light blocking parts OP and OPA of the photo-mask 10, and the photo-mask 10 corresponding to the contact hole 245 may be transparent. This is a condition of an embodiment where the insulating layer 240 corresponding to the part exposed by light through the photo-mask 10 is removed, however the transparent part and the light blocking part of the photo-mask 10 may be exchanged with each other in another embodiment where the insulating layer 240 corresponding to the part exposed by light through the photo-mask 10 is maintained.

The region where the slit part SL and the light blocking part OP of the photo-mask 10 are alternately disposed corresponds to the thickness differential region 240S of the insulating layer 240, and the boundary (corresponding to a boundary 10SN) of the thickness differential region 240S is separated from the contact hole 245 by a predetermined distance, and the predetermined distance may be the same as the distance W1.

The boundary 10SN between the region where the slit part SL and the light blocking part OP of the photo-mask 10 are alternately disposed and the light blocking part OPA of the photo-mask 10 disposed around the contact hole 245 may be about matched with the edge of the opening 235 of the shielding part 230Rd.

In the region where the slit part SL and the light blocking part OP of the photo-mask 10 are alternately disposed, a ratio of the width Wa of the light blocking part OP and the width Wb of the slit part SL may be, for example, about 1.7:1.2, however it is not limited thereto.

As shown in FIG. 10, the cross-sectional structure of the insulating layer 240 formed by using the photo-mask 10 having the slit structure may represent the protrusions and depressions including the recess portion DPR and the convex part PRT alternately arranged in the second direction DR2 as shown in FIG. 9 and FIG. 12, or the thickness of the insulating layer 240 of the thickness differential region 240S is reduced depending on the process condition as shown in FIG. 11, however the protrusions and depressions are substantially shown and the upper surface of the insulating layer 240 may be flat.

Figure 13:
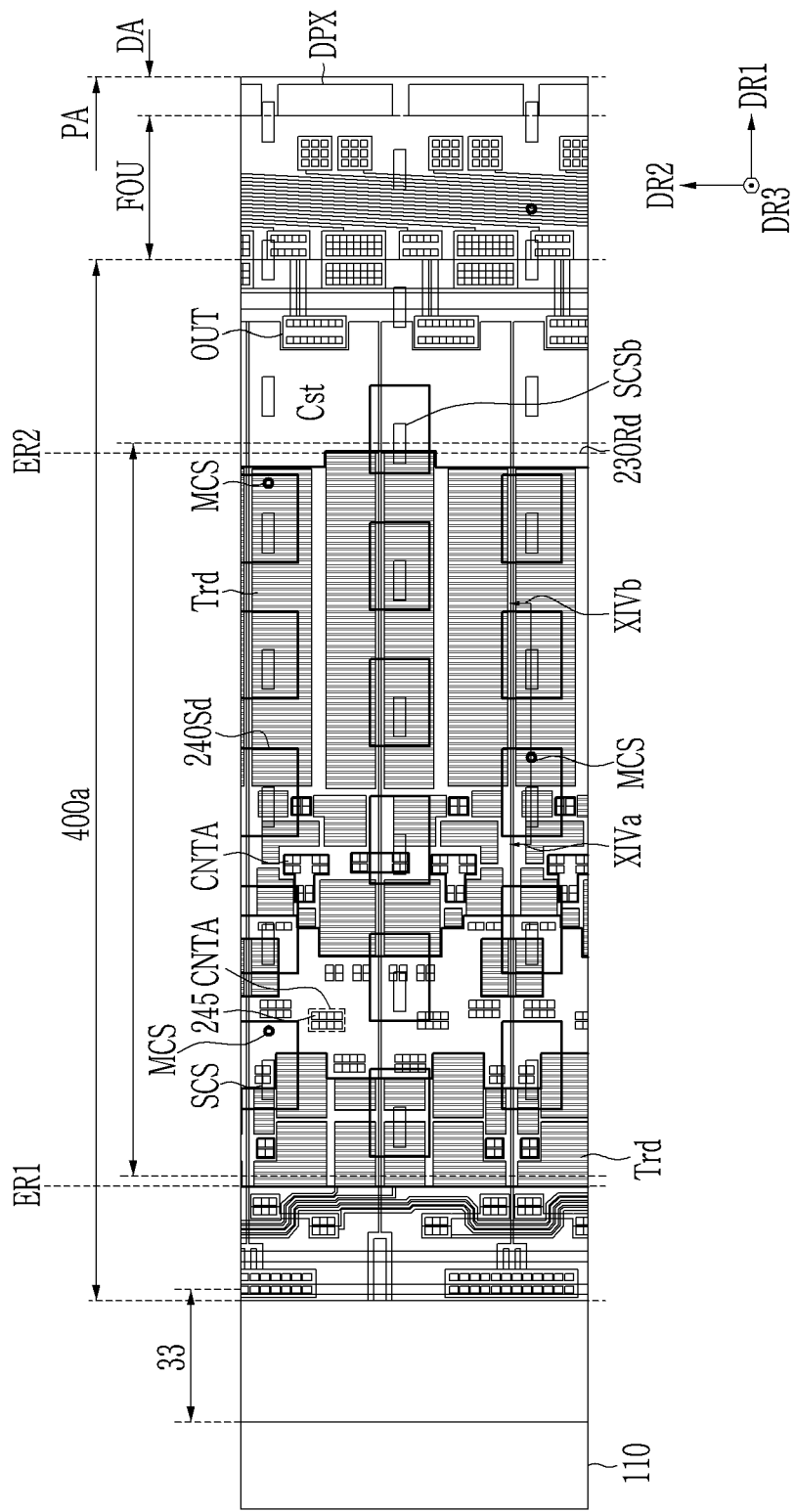
FIG. 13 is a top plan view of a non-display area of a display device according to an exemplary embodiment of the present inventive concept.
Figure 14:
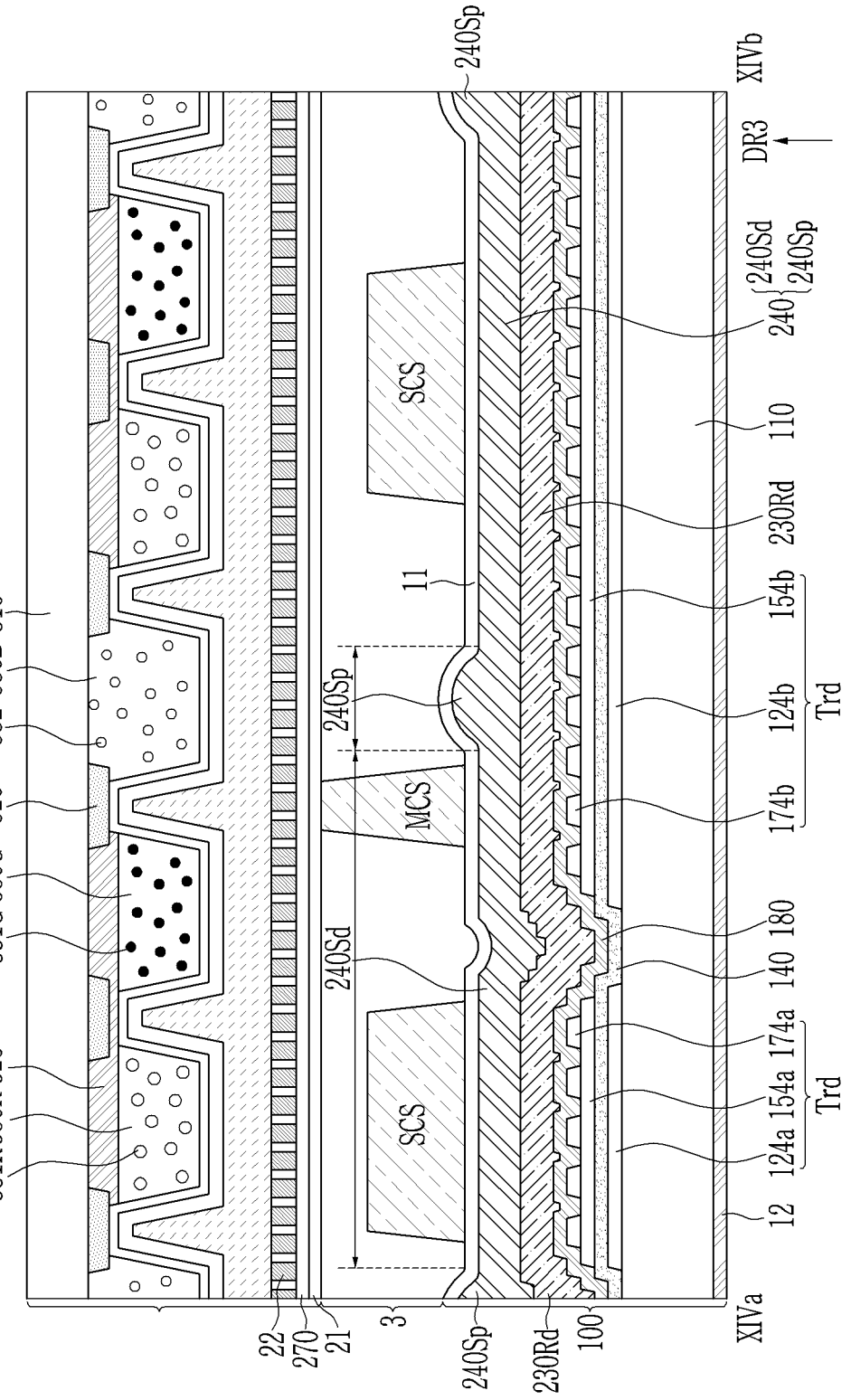
FIG. 14 is a cross-sectional view of the display device shown in FIG. 13 taken along a line XIVa-XIVb.

FIG. 13 is a top plan view of a non-display area of a display device according to an exemplary embodiment of the present inventive concept, and FIG. 14 is a cross-sectional view of the display device shown in FIG. 13 taken along a line XIVa-XIVb.

Referring to FIG. 13, the display device according to the present embodiment is the same as most of the above-described embodiment, however the thickness differential region overlapping the gate driver 400a may not be formed to be continuous. That is, the insulating layer 240 may include a plurality of thickness differential regions 240Sd separated from each other and overlapping the transistors Trd of the gate driver 400a. Each thickness differential region 240Sd may overlap one or more spacers MCS and SCS. For example, as shown in FIG. 13, one thickness differential region 240Sd may overlap one sub-spacer SCS, or simultaneously one sub-spacer SCS and one main spacer MCS.

Referring to FIG. 13 and FIG. 14, the thickness of the thickness differential region 240Sd of the insulating layer 240 is smaller than the thickness of the rest of the insulating layer 240. The insulating layer 240 disposed between the adjacent thickness differential regions 240Sd has the relatively thick thickness, thereby forming a protrusion 240Sp.

The spacers MCS and SCS disposed on the gate driver 400a of the non-display area PA all overlap the thickness differential region 240Sd, and like the above-described embodiment, the stain failure due to the difference of the cell gap of the liquid crystal layer 3 may be prevented around the boundary of the non-display area PA and the display area DA.

Figure 15:
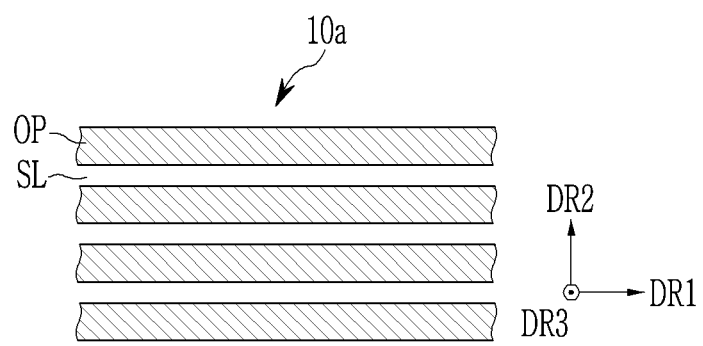
FIG. 15, FIG. 16, and FIG. 17 are top plan views of a photo-mask used in manufacturing a display device according to an exemplary embodiment of the present inventive concept.
Figure 16:
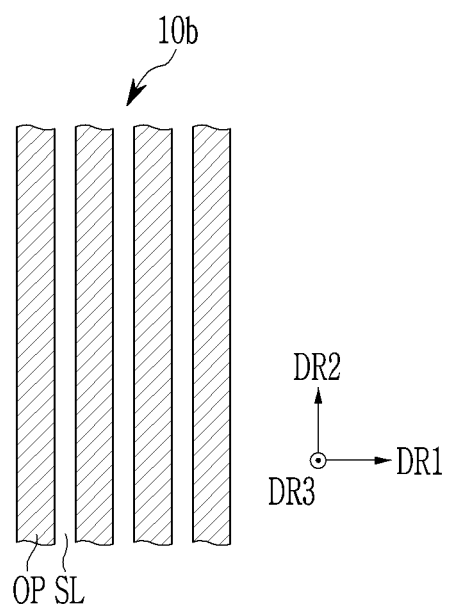
Figure 17:
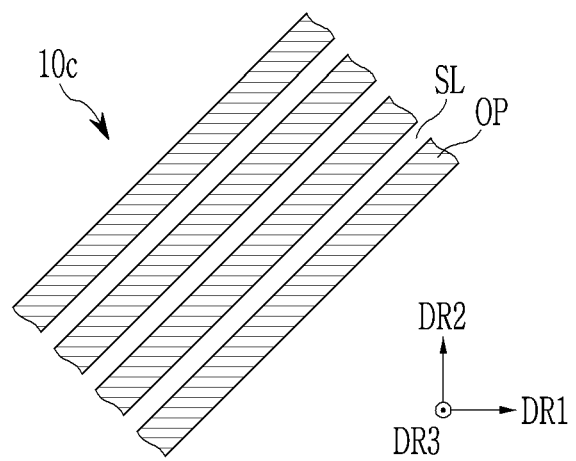

FIG. 15, FIG. 16, and FIG. 17 are top plan views of a photo-mask used in manufacturing of a display device according to an exemplary embodiment of the present inventive concept.

The slit part SL included in a photo-mask 10a used to form the insulating layer 240 by the photolithography process may extend approximately parallel to the first direction DR1 like the above-described exemplary embodiment shown in FIG. 10 and FIG. 15, and the slit part SL and the light blocking part OP may be alternately arranged in the second direction DR2.

According to another exemplary embodiment, the slit part SL included in the photo-mask 10a may extend approximately parallel to the second direction DR2 like the exemplary embodiment shown in FIG. 16, and the slit part SL and the light blocking part OP may be alternately arranged in the first direction DR1.

According to another exemplary embodiment, the slit part SL included in the photo-mask 10a may extend in an oblique direction with respect to the first direction DR1 and the second direction DR2 like the exemplary embodiment shown in FIG. 17.

Therefore, in the case of the exemplary embodiment in which the protrusions and depressions are formed on the upper surface of the insulating layer 240, the protrusion and depression portion of the insulating layer 240 may be alternately arranged in the direction in which the slit part SL of photo-masks 10a, 10b, and 10c and the light blocking part OP are alternately arranged.

While the present inventive concept has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:
1. A display device comprising:
a first substrate including a display area and a non-display area disposed outside the display area;
a first semiconductor disposed in the display area of the first substrate;
a second semiconductor disposed in the non-display area of the first substrate;
a first data conductor overlapping the first semiconductor;
a second data conductor overlapping the second semiconductor;
a first shielding part overlapping the first semiconductor and disposed on the first data conductor;

a second shielding part overlapping the second semiconductor and disposed on the second data conductor; and
an insulating layer disposed on the first shielding part and the second shielding part,
wherein a second thickness of the second shielding part is larger than a first thickness of the first shielding part, and
a fourth thickness of a second part of the insulating layer corresponding to the second shielding part is smaller than a third thickness of a first part of the insulating layer corresponding to the first shielding part.

2. The display device of claim 1, wherein
the first thickness is a minimum thickness of the first shielding part corresponding to the first semiconductor, and the second thickness is a minimum thickness of the second shielding part corresponding to the second semiconductor.

3. The display device of claim 1, wherein
a sum of the first thickness and the third thickness is a same sum as a sum of the second thickness and the fourth thickness.

4. The display device of claim 1, further comprising:
a first spacer overlapping the first shielding part; and
a second spacer overlapping the second shielding part.

5. The display device of claim 4, further comprising
a light unit overlapping the first substrate and emitting light of a first wavelength, and
the first shielding part and the second shielding part are configured to absorb the light of the first wavelength.

6. The display device of claim 4, further comprising
a gate driver disposed in the non-display area and including first transistors having the second semiconductor,
the insulating layer includes at least one thickness differential region overlapping the gate driver, and
an average thickness of the thickness differential region is smaller than an average thickness of the insulating layer except for the thickness differential region.

7. The display device of claim 6, wherein
the gate driver includes a plurality of stages arranged in a first direction, and
the thickness differential region extends in the first direction to overlap the gate driver.

8. The display device of claim 6, wherein
the insulating layer includes a plurality of separated thickness differential regions overlapping the gate driver.

9. The display device of claim 6, further comprising:
a first spacer overlapping the first shielding part; and
a second spacer overlapping the second shielding part and the thickness differential region.

10. The display device of claim 6, wherein
an upper surface of the thickness differential region has protrusions and depressions.

11. The display device of claim 6, wherein
the insulating layer disposed in the gate driver has a plurality of contact holes, and
a boundary of the thickness differential region is separated from the contact hole.

12. The display device of claim 1, further comprising:
a second substrate parallel to the first substrate;
a polarization layer disposed between the insulating layer and the second substrate; and
a color conversion layer disposed between the second substrate and the polarization layer,
wherein the polarization layer has reflectance, and
the first shielding part and the second shielding part are configured to prevent light reflected from the polarization layer from being incident to the first semiconductor and the second semiconductor.

13. The display device of claim 1, wherein
the insulating layer includes an organic material.

14. A display device comprising:
a first substrate including a display area and a non-display area disposed outside the display area;
a first semiconductor disposed in the display area of the first substrate;
a second semiconductor disposed in the non-display area of the first substrate;
a first shielding part overlapping the first transistor;
a second shielding part overlapping the second transistor; and
an insulating layer disposed on the first shielding part and the second shielding part,
wherein the first shielding part and the second shielding part are disposed at a same layer and include a same material as each other, and
a minimum thickness of the insulating layer overlapping the second shielding part is smaller than a minimum thickness of the insulating layer overlapping the first shielding part.

15. The display device of claim 14, wherein
the insulating layer includes at least one thickness differential region disposed in the non-display area, and
an average thickness of the thickness differential region is smaller than an average thickness of the insulating layer except for the thickness differential region.

16. The display device of claim 15, further comprising:
a first spacer overlapping the first shielding part; and
a second spacer overlapping the second shielding part and the thickness differential region.

17. The display device of claim 15, wherein:
an upper surface of the thickness differential region has protrusions and depressions.

18. The display device of claim 14, wherein
an average thickness of the second shielding part is larger than an average thickness of the second shielding part.

19. The display device of claim 14, wherein
the insulating layer includes an organic material.

20. The display device of claim 14, further comprising:
a second substrate parallel to the first substrate;
a polarization layer disposed between the insulating layer and the second substrate; and
a color conversion layer disposed between the second substrate and the polarization layer,
wherein the polarization layer has reflectance, and
the first shielding part and the second shielding part are configured to prevent light reflected from the polarization layer from being incident to the first transistor and the second transistor.

* * * * *